Patented July 5, 1938

2,122,884

UNITED STATES PATENT OFFICE 2,122,884

BUTYL ALCOHOL FERMENTATION PROCESS

David A. Legg and Hugh R. Stiles, Terre Haute, Ind., assignors to Commercial Solvents Corporation, Terre Haute, Ind., a corporation of Maryland No Drawing. Application July 12, 1934, Serial No. 734,802

10 Claims. (Cl. 195—44)

The present invention relates to the utilization of waste carbohydrate materials, such as those obtained in the acid hydrolysis of grain or starch. More particularly, the present invention relates to the utilization of hydrol, the waste residual material from the corn-sugar industry, as a source of carbohydrate for fermentation by means of bacteria of the group *Clostridium saccharo-acetobutylicum*.

Hydrol comprises the molasses obtained as the residual mother liquor from which corn sugar is crystallized. This material contains about 75% solids, the major portion of which comprises glucose. However, substantial proportions of dextrin and other intermediate types of carbohydrates are present. A typical analysis of hydrol, as usually obtained, is the following:

| | Per cent |
|---|---|
| Glucose | 55 |
| Dextrin and other carbohydrates higher than glucose | 18 |
| Water | 27 |

Different samples of hydrol may vary considerably from the figures shown above, but this analysis illustrates, in general, the type of material under consideration. It is, therefore, to be understood that the term "containing substantial concentrations of higher soluble carbohydrates" as used herein and in the appended claims denotes concentrations of the order of those found in hydrol. Hydrol is available in relatively large quantities, and in view of the high carbohydrate content, many attempts have been made to utilize it in commercial fermentations, especially in the butyl alcohol fermentation. However, up to the present time, no successful method has been devised for fermenting this material in desirably high concentrations. It has been possible to substitute small amounts in the fermentation of maize mashes by means of bacteria of the type *Clostridium acetobutylicum*. Such a method, however, has obvious disadvantages, especially from the standpoint of utilizing hydrol directly at the source of its production, without the necessity of fermenting large amounts of maize.

It has also been attempted to utilize hydrol for the production of butyl alcohol by means of bacteria of the group *Clostridium saccharo-acetobutylicum* or other butyl organisms of the type which readily ferment sugar solutions. However, it has been found that low yields were obtained in such fermentations unless the hydrol were subjected to further acid hydrolysis or other costly procedures which overcame the economic advantage of utilizing a waste product of this nature.

We have now discovered that hydrol can be successfully fermented by bacteria of the group *Clostridium saccharo-acetobutylicum* without the necessity of any preliminary treatment if certain types of nitrogenous nutrients are employed in the mash. The nutrients which we have found to be suitable for this purpose comprise grain distillery slops such as grain alcohol distillery slops or the slop from the butyl-acetonic fermentation of grain mashes. These materials are especially suited for satisfying the deficiency in nitrogen in hydrol mashes, being superior to other proteinaceous materials or even other distillery slops such as those from molasses fermentation. The advantages of the use of this type of nitrogenous nutrient may be seen from the following table:

*Table I*

| Hydrol concentration; grams sugar per 100 cc. | Ammonium sulfate concentration; grams per 100 cc. | Supplementary nitrogenous nutrient | Concentration of supplementary nutrient; grams per 100 cc. | Solvent yield percent of total sugar |
|---|---|---|---|---|
| 5.0 | 0.3 | | | 4.8 |
| 4.9 | 0.3 | Tankage | 0.7 | 7.7 |
| 5.4 | 0.3 | Maize meal | 0.7 | 16.4 |
| 5.3 | 0.3 | Barley malt | 0.7 | 21.5 |
| 5.0 | 0.3 | Maize germ meal | 0.7 | 24.1 |
| 5.3 | 0.3 | Wheat middlings | 0.7 | 24.4 |
| 5.1 | 0.3 | Grain alcohol distillery slop | *30.0 | 33.0 |

* c. c. whole slop per 100 cc.

It may be seen from the above table that, with the exception of the last in the series, employing the nutrients of the present invention, none of the hydrol fermentations could be said to be successful from a commercial standpoint.

The general type of fermentation to which our invention is applicable is illustrated in copending application U. S. Ser. No. 675,459 by J. C. Woodruff, H. R. Stiles, and D. A. Legg, filed June 12, 1933, now Patent No. 2,089,552, issued August 10, 1937. The organisms employed are bacteria of the group *Clostridium saccharo-acetobutylicum*, which are described at length in said application. Our process is particularly adapted to fermentations by means of *Clostridium saccharo-acetobutylicum* α, which is likewise described in detail in the copending application now Patent No. 2,089,552. According to the general process of said application, now Patent No. 2,089,552, the soluble carbohydrate mashes, containing an ammonium compound, and preferably additional degraded protein material, are fermented by means of bacteria of the group *Clostridium saccharo-acetobutylicum* while controlling the acidity of the fermenting mash whereby the final hydrogen ion concentration secured by the action of the bacteria falls within the range pH 5.0 to pH 6.2. Our present invention follows this general procedure, utilizing the specific combined supplementary nitrogenous nutrients herein described.

The grain distillery slops employed in our process may be utilized in the form of the whole slop or its equivalents, such as concentrated slops, evaporated feeds, or the like. Screened feeds and similar materials from which the soluble material has been removed will not, in general, be found to be as satisfactory as the materials including all of the degraded nitrogenous substances.

The optimum amount of distillery slop to be added in any fermentation will depend upon the amount of other nitrogenous material present in the mash. For example, a mixed beet molasses-hydrol mash will require less additional nitrogenous material than one in which hydrol comprises substantially all of the fermentable carbohydrate. However, in general it may be said that from 10–90% by volume of whole slop, or its equivalent of the concentrated materials, will be found to be satisfactory. Grain alcohol distillery slops generally contain considerably higher concentrations of nitrogenous materials than are present in grain distillery slops from the butyl-acetonic fermentation. The grain alcohol slops, therefore, may usually be employed in somewhat smaller amounts in the present process. From 10–50% of whole slop, based on the total volume of the mash, will generally be found to be satisfactory. In the case of the butyl-acetonic slops, on the other hand, from 20–90% will usually be employed. In this case the slop may even be substituted for all of the water in the mash if desired. However, for most purposes we prefer to utilize from 30–40% by volume of grain alcohol slops or from 70–90% by volume of butyl-acetonic slop. These concentrations may advantageously be employed in any mash containing hydrol as a major source of carbohydrate. Smaller amounts may be sufficient in many cases, and the lower economical limit may easily be determined by preliminary fermentations.

In conjunction with the grain distillery slops, ammonia or ammonium salts should be employed in accordance with the procedure of U. S. Ser. No. 675,459 now Patent No. 2,089,552. The optimum amount of ammonia nitrogen to be employed in any particular case will, of course, depend to some extent upon the concentration and state of degradation of the other nitrogenous materials present. However, it may be said that in general from 0.1–0.5% by wt. of ammonium sulfate or its equivalent will be found to be satisfactory. Concentrations of 0.2–0.4% will be preferable in most cases.

The grain slops, especially those from yeast fermentations, will usually be found to contain considerable amounts of organic acids. For example, whole slop from grain alcohol distilleries will usually be found to have a pH of 3.5 to 4.0. This slop may advantageously be neutralized to a pH of from 6.0 to 6.4 before incorporating it into the mash to be employed in the present process. However, if desired, the slop may be incorporated in the mash in its original form, the hydrogen ion concentration of the entire mash then being regulated in accordance with the procedure of copending application U. S. Ser. No. 675,459 now Patent No. 2,089,552. According to this procedure, the acidity of the fermenting mash is regulated either by the addition of insoluble alkaline neutralizing agents at the beginning of the fermentation, or by continuous or semi-continuous neutralization during the fermentation, whereby the final hydrogen ion concentration falls within the range 5.0 to 6.2. Although any of these procedures may be employed, we prefer to neutralize the distillery slop to a pH of approximately 6.2 by means of an alkali metal compound such as soda ash, and to incorporate into the hydrol-slop mash a slight excess, e. g. 0.3–0.6%, of an insoluble alkaline neutralizing agent such as calcium carbonate. This latter material may suitably be in very finely divided form, such as a freshly precipitated carbonate. If sufficient alkaline buffering material is already present in the mash, as for example in the case of certain mashes containing high proportions of beet molasses, it may be found to be unnecessary to add alkaline materials at any stage of the process.

The following examples illustrate the process of the present invention:

*Example I*

A sterile hydrol mash (5.1% total reducing sugars) containing 30% by volume of grain alcohol distillery slop, 0.3% by weight of $(NH_4)_2SO_4$, 0.07% by weight of $K_2HPO_4$, and 0.6% by weight of $CaCO_3$ was inoculated with an actively fermenting culture of *Clostridium saccharo-acetobutylicum* α and incubated at 30° C. for 68 hours. The yield and solvent ratio were found to be as follows:

| Yield | | Solvent ratio | | |
| --- | --- | --- | --- | --- |
| Percent of total sugar | Grams solvents per liter | Butyl alcohol | Acetone | Ethyl alcohol |
| 33.0 | 16.7 | 67.5 | 28.1 | 4.4 |

*Example II*

A sterile mash containing 5.3% of total reducing sugars (96% hydrol—4% cane molasses), 40% by volume of grain alcohol distillery slop (adjusted to pH 6.0 with soda ash), 0.2% by weight of $(NH_4)_2SO_4$, and 0.3% by weight of precipitated $CaCO_3$ was inoculated with an actively fermenting culture of *Clostridium saccharo-acetobutylicum* α and incubated at 30° C. for 68 hours. The yield and solvent ratio were found to be as follows:

| Yield | | Solvent ratio | | |
|---|---|---|---|---|
| Percent of total sugar | Grams solvents per liter | Butyl alcohol | Acetone | Ethyl alcohol |
| 32.7 | 17.3 | 70.9 | 25.8 | 3.3 |

*Example III*

A sterile hydrol mash (4.8% of total reducing sugars) containing 84% by volume of butyl-acetonic slop (from the fermentation of 7.5% maize mash by *Clostridium acetobutylicum* (Weizmann) neutralized with soda ash to a pH of 6.0), 0.2% by weight of (NH₄)₂SO₄ and 0.4% by weight of CaCO₃ was inoculated with an actively fermenting culture of *Clostridium saccharo-acetobutylicum α* and incubated at 30° C. for 68 hours. The yield and solvent ratio were found to be as follows:

| Yield | | Solvent ratio | | |
|---|---|---|---|---|
| Percent of total sugar | Grams solvents per liter | Butyl alcohol | Acetone | Ethyl alcohol |
| 33.9 | 16.1 | 65.7 | 29.9 | 4.4 |

*Example IV*

A sterile hydrol mash (5.4% of total reducing sugars) containing 93% by volume of butyl-acetonic slop (from the fermentation of 7.5% maize mash by *Clostridium acetobutylicum* (Weizmann) neutralized with soda ash to a pH of 5.8), 0.2% by weight of (NH₄)₂SO₄ and 0.4% by weight of CaCO₃ was inoculated with an actively fermenting culture of *Clostridium saccharo-acetobutylicum α* and incubated at 30° C. for 68 hours. The yield and solvent ratio were found to be as follows:

| Yield | | Solvent ratio | | |
|---|---|---|---|---|
| Percent of total sugar | Grams solvents per liter | Butyl alcohol | Acetone | Ethyl alcohol |
| 31.6 | 17.2 | 66.2 | 31.4 | 2.4 |

*Example V*

A sterile mash containing 5.0% of total reducing sugars (50% hydrol—50% beet molasses) containing 16% by volume of grain alcohol distillery slop and 0.03% by weight of (NH₄)₂HPO₄ was inoculated with an actively fermenting culture of *Clostridium saccharo-acetobutylicum α* and incubated at 30° C. for 68 hours. The yield and solvent ratio were found to be as follows:

| Yield | | Solvent ratio | | |
|---|---|---|---|---|
| Percent of total sugar | Grams solvents per liter | Butyl alcohol | Acetone | Ethyl alcohol |
| 34.8 | 17.5 | 74.0 | 22.9 | 3.1 |

It may be seen that practically theoretical yields were obtained in Examples I and III and that in the higher concentration mashes of Examples II and IV absolute yields of over 17 grams per liter were obtained even though the percentage yield, based on sugar content, decreased somewhat. The high yield in Example V is believed to be due in part to the presence of fermentable carbohydrates other than reducing sugars in beet molasses. All of these values represent extremely satisfactory yields from a commercial standpoint, and exceed any yields previously obtainable with hydrol mashes.

Although our invention has been illustrated by the above specific examples, it is to be distinctly understood that it is not limited to the particular materials or procedures described therein. For example, although our invention is particularly adapted to the fermentation of hydrol, it will be evident to those skilled in the art that this process may advantageously be applied to other soluble carbohydrate materials which contain monose sugars as major constituents and substantial amounts of higher carbohydrates which are deficient in suitable nitrogenous nutrients for this type of fermentation. Various equivalent materials readily suggest themselves, as for example wood sugar solutions which contain glucose and higher polymers, solutions obtained by the hydrolysis of corncobs or other pentosan-containing materials which solutions contain xylose or other pentose sugars, together with higher carbohydrates of this series, and other similar solutions containing soluble carbohydrates and deficient in suitable nitrogenous nutrients. It will also be apparent to one skilled in the art that various mixed mashes other than the particular hydrol-molasses mashes of Examples II and V may suitably be employed. Our process is applicable, generally, to mashes containing hydrol or an equivalent material as a major component, irrespective of the remaining carbohydrate content.

The bacteria designated herein as *Clostridium saccharo acetobutylicum* comprise any bacteria having the following primary characteristics:

I. Morphological.
    A. Rod-shaped.
    B. Spore-forming—Clostridia and Plectridia.
    C. Practically indistinguishable from members of the *Clostridium butyricum* group.

II. Biochemical.
    A. Carbohydrate fermentation.
        1. Ability to produce fair yields of butyl alcohol and acetone consistently from starch as the sole source of carbohydrate (i. e., corn or other mash containing starch and suitable nutrients)
        2. Ability to produce yields of butyl alcohol and acetone consistently above 30% on the weight of the sugar from 5% sucrose media or 5.5% uninverted molasses medium containing about 0.3% (NH₄)₂SO₄ and about 0.4% of 200 mesh calcite, based on the mash volume.
        3. Ability to produce yields of butyl alcohol and acetone consistently above 30% on the weight of the sugar from 5% glucose media with suitable nutrients, or an inverted molasses medium corresponding to the uninverted molasses medium of (2) above.

B. Nitrogen metabolism.
1. Ability to produce high yields of butyl alcohol and acetone in sugar media containing ammonia as the principal source of nitrogen.
2. Ability to utilize degraded protein (including ammonia) as sole nitrogen source.
3. Inability to utilize undegraded protein as sole source of nitrogen.
4. Inability to liquefy gelatin or to produce more than very slight proteolysis of milk.
C. Oxygen requirements.
1. Anaerobic.
D. Temperature range for solvent production.
1. From 24° C. to 40° C. preferably 29° C. to 30° C.
E. Hydrogen ion concentration for solvent production.
1. Final pH of 5.0–6.2, preferably 5.4–5.85.

Although the fermentations of the examples were all carried out by means of Clostridium saccharo-acetobutylicum α, any of the bacteria of the general group Clostridium saccharo-acetobutylicum may be employed or any other bacteria having the general characteristics set forth in copending application U. S. Ser. No. 675,459 now Patent No. 2,089,552. For example, the chromogenic strains Clostridium saccharo-acetobutylicum β and Clostridium saccharo-acetobutylicum γ described in copending application U. S. Ser. No. 714,633 by C. F. Arzberger, filed March 8, 1934, now Patent No. 2,050,219, issued August 4, 1936, may suitably be employed in our process. These bacteria have the following primary characteristics:

I. Morphological.
A. Rod-shaped.
B. Spore-forming—Clostridia and Plectridia.
C. Practically indistinguishable from members of the Clostridium butyricum group.
II. A. Biochemical.
1. Ability to produce yields of butyl alcohol and acetone consistently above 30% on the weight of the sugar from 6% sucrose media or uninverted molasses mashes of the type described herein.
2. Ability to produce yields of butyl alcohol and acetone consistently above 30% on the weight of the sugar from 6% glucose media with suitable nutrients, or an inverted molasses mash.
B. Nitrogen metabolism.
1. Ability to produce high yields of butyl alcohol and acetone in sugar media containing ammonia as the principal source of nitrogen.
2. Ability to utilize degraded protein (including ammonia) as the sole nitrogen source.
3. Inability to utilize undegraded protein as sole source of nitrogen.
4. Inability to liquefy gelatin or to produce more than slight proteolysis of milk.
C. Oxygen requirements.
1. Anaerobic.
D. Temperature range for solvent production.
1. From 24° C. to 40° C., preferably 29° C. to 30° C.
E. Hydrogen ion concentration for solvent production.
1. Final pH of 5.0–6.2, preferably 5.4–5.85.
F. Chromogenesis—orange to red.

Likewise, various modifications of procedure may be employed. For example, if a mixed mash is to be employed, such as a hydrol-molasses mash, the fermentation could suitably be started in molasses mash and the hydrol-slop solution added to this mash after fermentation had become sufficiently active. Any of the modifications applicable to this type of fermentation which are disclosed in copending application U. S. Ser. No. 675,459 now Patent No. 2,089,552 may be adapted to the present process. In general it may be said that any such modifications or the use of any equivalents which would naturally occur to one skilled in the art may be employed without departing from the scope of our invention.

Our invention now having been described, what we claim is:

1. In a fermentation of the Clostridium saccharo-acetobutylicum type in which the fermenting medium comprises essentially a soluble carbohydrate mash containing monose sugar as a major component, containing substantial concentrations of higher soluble carbohydrates, and deficient in suitable nitrogenous nutrients for said type of fermentation, the step which comprises effecting the fermentation in the presence of the combined supplementary nutrient consisting of ammonia nitrogen in a concentration equivalent to from 0.1 to 0.5% by weight of ammonium sulfate and in excess of 10% by volume of grain distillery slop chosen from the group consisting of slop from a grain mash fermentation by means of starch-fermenting butyl alcohol bacteria and slop from a yeast fermentation of a saccharified grain mash.

2. In a fermentation of the Clostridium saccharo-acetobutylicum type in which the fermenting medium comprises essentially a soluble carbohydrate mash containing monose sugar as a major component, containing substantial concentrations of higher soluble carbohydrates, and deficient in suitable nitrogenous nutrients for said type of fermentation, the step which comprises effecting the fermentation in the presence of the combined supplementary nutrient consisting of from 0.2 to 0.4% by weight of an ammonium salt and from 10–50% by volume of grain alcohol distillery slop.

3. In a fermentation of the Clostridium saccharo-acetobutylicum type in which the fermenting medium comprises essentially a soluble carbohydrate mash containing monose sugar as a major component, containing substantial concentrations of higher soluble carbohydrates, and deficient in suitable nitrogenous nutrients for said type of fermentation, the step which comprises effecting the fermentation in the presence of the combined supplementary nutrient consisting of from 0.2 to 0.4% by weight of an ammonium salt and from 20–90% by volume of grain distillery slop from the butyl-acetonic fermentation of a grain mash by means of starch-fermenting butyl alcohol bacteria.

4. In a fermentation of an essentially soluble carbohydrate mash containing hydrol as a major constituent, by means of bacteria of the group Clostridium saccharo-acetobutylicum, the step which comprises effecting the fermentation in the presence of ammonia nitrogen and grain distillery slop chosen from the group consisting of slop from a grain mash fermentation by means of starch-fermenting butyl alcohol bacteria and slop from a yeast fermentation of a saccharified grain mash.

5. In a fermentation of an essentially soluble carbohydrate mash containing hydrol as a major constituent, by means of bacteria of the group *Clostridium saccharo-acetobutylicum*, the step which comprises effecting the fermentation in the presence of ammonia nitrogen in a concentration equivalent to from 0.1 to 0.5% by weight of ammonium sulfate and in excess of 10% by volume of grain distillery slop chosen from the group consisting of slop from a grain mash fermentation by means of starch-fermenting butyl alcohol bacteria and slop from a yeast fermentation of a saccharified grain mash.

6. In a fermentation of an essentially soluble carbohydrate mash containing hydrol as a major constituent, by means of bacteria of the group *Clostridium saccharo-acetobutylicum* the step which comprises effecting the fermentation in the presence of from 0.2 to 0.4% by weight of an ammonium salt and from 30–40% by volume of grain alcohol distillery slop.

7. In a fermentation of an essentially soluble carbohydrate mash containing hydrol as a major constituent, by means of bacteria of the group *Clostridium saccharo-acetobutylicum*, the step which comprises effecting the fermentation in the presence of from 0.2 to 0.4% by weight of an ammonium salt and from 70–90% by volume of grain distillery slop from the butyl-acetonic fermentation of a grain mash by means of starch-fermenting butyl alcohol bacteria.

8. In a fermentation of an essentially soluble carbohydrate mash containing hydrol as a major constituent, by means of *Clostridium saccharo-acetobutylicum* α, the step which comprises effecting the fermentation in the presence of ammonia nitrogen and grain distillery slop chosen from the group consisting of slop from a grain mash fermentation by means of starch-fermenting butyl alcohol bacteria and slop from a yeast fermentation of a saccharified grain mash.

9. In a fermentation of an essentially soluble carbohydrate mash containing hydrol as a major constituent, by means of *Clostridium saccharo-acetobutylicum* β, the step which comprises effecting the fermentation in the presence of ammonia nitrogen and grain distillery slop chosen from the group consisting of slop from a grain mash fermentation by means of starch-fermenting butyl alcohol bacteria and slop from a yeast fermentation of a saccharified grain mash.

10. In a fermentation of an essentially soluble carbohydrate mash containing hydrol as a major constituent, by means of *Clostridium saccharo-acetobutylicum* γ, the step which comprises effecting the fermentation in the presence of ammonia nitrogen and grain distillery slop chosen from the group consisting of slop from a grain mash fermentation by means of starch-fermenting butyl alcohol bacteria and slop from a yeast fermentation of a saccharified grain mash.

DAVID A. LEGG.
HUGH R. STILES.